(12) United States Patent
Elswick

(10) Patent No.: US 10,019,621 B2
(45) Date of Patent: Jul. 10, 2018

(54) IDENTIFYING A VEHICLE USING A MOBILE DEVICE

(71) Applicant: General Motors LLC, Detroit, MI (US)

(72) Inventor: Richard L. Elswick, Warren, MI (US)

(73) Assignee: General Motors LLC, Detroit, MI (US)

(*) Notice: Subject to any disclaimer, the term of this patent is extended or adjusted under 35 U.S.C. 154(b) by 0 days.

(21) Appl. No.: 15/265,652

(22) Filed: Sep. 14, 2016

(65) Prior Publication Data
US 2018/0075287 A1    Mar. 15, 2018

(51) Int. Cl.
| | | |
|---|---|---|
| *G06K 9/00* | (2006.01) | |
| *G06T 11/00* | (2006.01) | |
| *G08G 1/00* | (2006.01) | |
| *H04B 10/112* | (2013.01) | |
| *H04W 4/80* | (2018.01) | |
| *H04W 4/00* | (2018.01) | |

(52) U.S. Cl.
CPC ......... *G06K 9/00214* (2013.01); *G06T 11/00* (2013.01); *G08G 1/202* (2013.01); *H04B 10/1123* (2013.01); *G06K 9/00671* (2013.01); *G06T 2207/30252* (2013.01); *G06T 2219/2004* (2013.01); *H04W 4/008* (2013.01); *H04W 4/80* (2018.02)

(58) Field of Classification Search
CPC ................................................. G06K 9/00671
See application file for complete search history.

(56) References Cited

U.S. PATENT DOCUMENTS

| | | | | |
|---|---|---|---|---|
| 5,898,377 A * | 4/1999 | Adachi | ............... | G08B 17/107 250/573 |
| 9,365,188 B1 * | 6/2016 | Penilla | ............... | B60R 25/2018 |
| 2013/0069985 A1 * | 3/2013 | Wong | ................... | G02B 27/017 345/633 |
| 2013/0336628 A1 * | 12/2013 | Lamb | ...................... | H04N 9/79 386/224 |
| 2014/0272671 A1 * | 9/2014 | Handa | ...................... | F17C 5/06 429/515 |
| 2015/0161832 A1 * | 6/2015 | Esselink | ............ | G07C 9/00015 340/5.22 |
| 2016/0210675 A1 * | 7/2016 | Smart | ................... | G06Q 10/02 |

* cited by examiner

*Primary Examiner* — Kee M Tung
*Assistant Examiner* — Grace Q Li
(74) *Attorney, Agent, or Firm* — David Willoughby

(57) ABSTRACT

A communication system and a method of identifying a target vehicle using application software on a mobile device. The method includes the steps of receiving at the mobile device a wireless signal transmitted from a transmitter at the target vehicle, wherein the wireless signal is received using an imaging detector in the mobile device; identifying that the target vehicle is a source of the wireless signal based on characteristics of the wireless signal; and in response to the identification, displaying to a user on a display of the mobile device an indication of an identity of the target vehicle.

15 Claims, 3 Drawing Sheets

IDENTIFYING A VEHICLE USING A MOBILE DEVICE

TECHNICAL FIELD

The present invention relates to identifying a vehicle using a mobile device.

BACKGROUND

In recent years, vehicle taxi services are being provided by unmarked vehicles. One commercial implementation of such services includes the use of Uber™ cabs or vehicles. These vehicles, for example, are often the owners' private vehicles—often primarily dedicated to personal use. Thus, the vehicle purposely is indistinguishable from other automotive vehicles on the road—as the owner may not desire to drive his or her vehicle for personal use with paintings or markings advertising taxi services.

When a taxi client wishes to be transported from one location to another, the client may contact a taxi service requesting pick-up. However, when a designated vehicle arrives, the client may have difficulty identifying the taxi vehicle since it has no distinctive markings. Thus, there is a need to assist the client in identifying such unmarked vehicles.

SUMMARY

According to an embodiment of the invention, there is provided a method of identifying a target vehicle using application software on a mobile device. The method includes the steps of: receiving at the mobile device a wireless signal transmitted from a transmitter at the target vehicle, wherein the wireless signal is received using an imaging detector in the mobile device; identifying that the target vehicle is a source of the wireless signal based on characteristics of the wireless signal; and in response to the identification, displaying to a user on a display of the mobile device an indication of an identity of the target vehicle.

According to another embodiment of the invention, there is provided a method of identifying a target vehicle using application software on a mobile device. The method includes the steps of: transmitting from the mobile device a vehicle transportation service request to a remote server; in response to the transmitted request, receiving at a camera of the mobile device a beacon signal that includes identifying information, wherein the beacon signal is comprised of light; in response to the receiving the beacon signal, identifying that a source of the beacon signal is the target vehicle based on the identifying information; and in response to the identifying step, displaying on a display of the mobile device video image data that includes an image of the target vehicle and a computer-generated graphical element overlaying or merged with the image of the target vehicle, wherein the image of the target vehicle and graphical element are arranged to enable a user of the mobile device to identify the target vehicle.

According to another embodiment of the invention, there is provided a computer program product that includes a non-transitory computer-readable medium for a mobile device, that includes computer program instructions that enable the mobile device to identify a target vehicle based on a wireless beacon signal transmitted from the target vehicle that is comprised of light. The computer program product includes: instructions for transmitting from the mobile device a vehicle transportation service request to a remote server; instructions for receiving at a camera of the mobile device a beacon signal that includes identifying information in response to the transmitted request; instructions for identifying that a source of the beacon signal is the target vehicle based on the identifying information; and instructions for, in response to executing the identifying instructions, displaying on a display of the mobile device augmented reality (AR) video image data that includes an image of the target vehicle and a computer-generated graphical element overlaying or merged with the image of the target vehicle, wherein the AR video image data is arranged to assist a user of the mobile device to identify and locate the target vehicle.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

A communication system 10 is described below that enables a user of a mobile device to locate and identify a proximately located vehicle. While not required, the user of the mobile device may not be the user or a previous user of the vehicle. For example, the mobile device user may make a virtual or telephonic request to be picked up by a taxi service and the communication system described herein may enable the user to identify a taxi vehicle when it arrives. According to at least one embodiment, the taxi vehicle may emit a wireless signal (e.g., an IR beacon signal), and using a camera of the mobile device, the mobile device may be able to identify the taxi vehicle by identifying the beacon signal. Further, once identified, the mobile device may be configured to use augmented reality (AR) techniques to display both the taxi vehicle as well as an AR graphic that highlights or alerts the mobile device user to which displayed object is the taxi vehicle. This may be particularly helpful to the user of the mobile device when the taxi vehicle is unmarked and there are a number of other vehicles in relatively close proximity. Of course, the communication system described below is merely one example of a suitable system; e.g., various aspects of the system 10 may differ in other embodiments.

Figure 1:
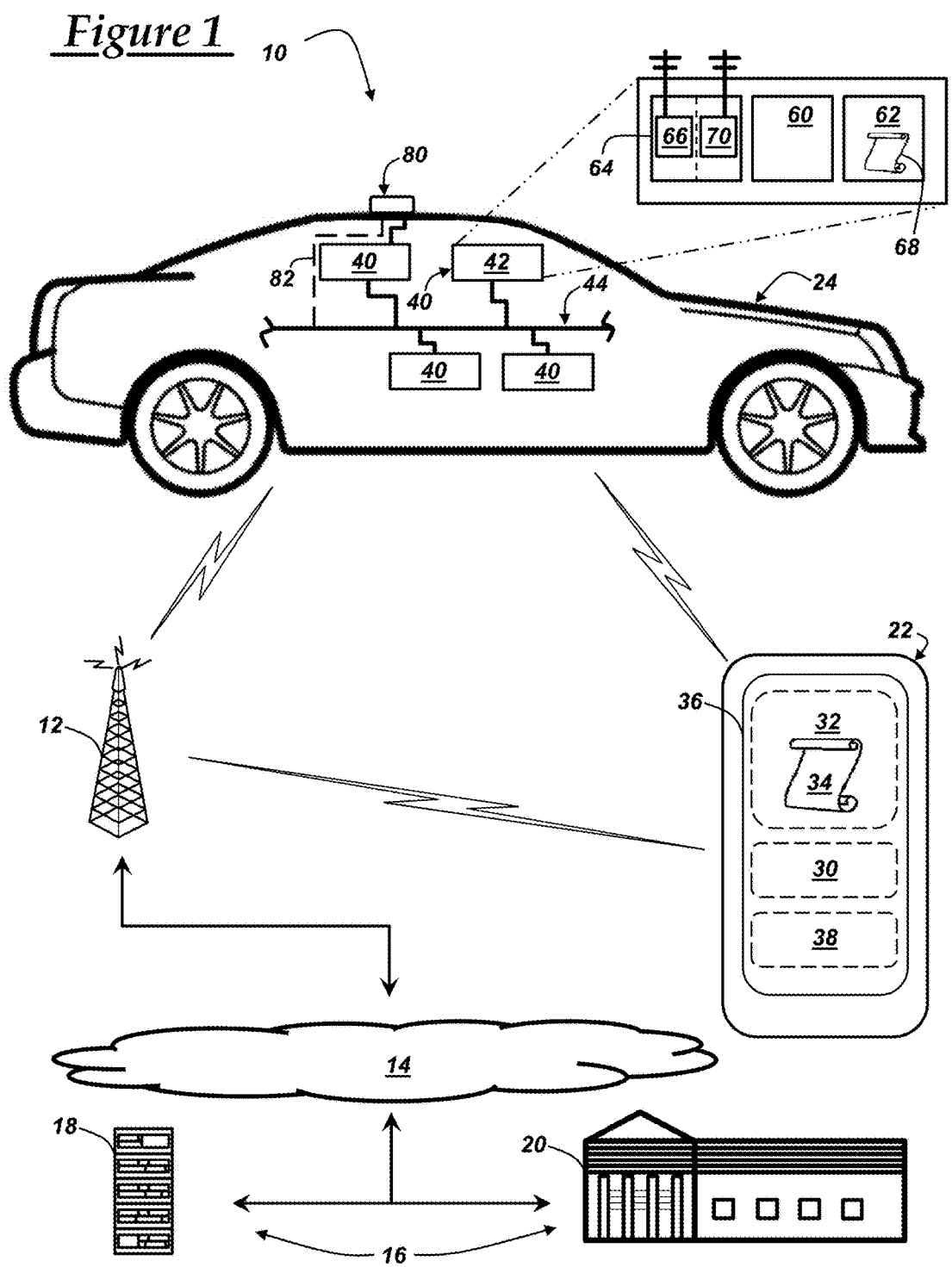
FIG. 1 is a schematic diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes: one or more wireless carrier systems 12; a land communications network 14; a backend system 16 that includes at least one of a remote server 18 or a data service center 20; a mobile device 22; and a vehicle 24. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 12 is preferably a cellular telephone system that in some implementations includes a plurality of cell towers (only is one shown), one or more mobile switching centers (MSCs) (not shown), as well as any other networking components required to connect wireless carrier system 12 with land network 14. Each cell tower includes sending and receiving antennas and a base station, with the base stations from different cell towers being connected to the MSC either directly or via intermediary equipment such as a base station controller. Cellular system 12 can implement any suitable communications technology, including for example, analog technologies such as AMPS, or the newer digital technologies such as GSM/GPRS, CDMA (e.g., CDMA2000), or LTE. As will be appreciated by those skilled in the art, various cell tower/base station/MSC arrangements are possible and could be used with wireless system 12. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Land network 14 may be a conventional land-based telecommunications network that is connected to one or more landline telephones and connects wireless carrier system 12 to backend system 16. For example, land network 14 may include a public switched telephone network (PSTN) such as that used to provide hardwired telephony, packet-switched data communications, and the Internet infrastructure. One or more segments of land network 14 could be implemented through the use of a standard wired network, a fiber or other optical network, a cable network, power lines, other wireless networks such as wireless local area networks (WLANs), or networks providing broadband wireless access (BWA), or any combination thereof. Furthermore, data service center 20 need not be connected via land network 14, but could include wireless telephony equipment so that it can communicate directly with a wireless network, such as wireless carrier system 12.

Remote server 18 of system 16 can provide vehicles with a number of different system back-end functions and can be one of a number of computers accessible via a private or public network such as the Internet. Each such server 18 can be used for one or more purposes, such as a web server accessible via land network 14 and/or wireless carrier 12. Other such accessible servers 18 can be, for example: a service center computer where diagnostic information and other vehicle data can be uploaded from the vehicle 24; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 24 or data service center 20, or both. Remote server 18 can also be used for providing Internet connectivity such as DNS services or as a network address server that uses DHCP or other suitable protocol to assign an IP address to the vehicle 24. In one embodiment, the remote server 18 is part of or associated with the data service center 20; however, this is not required.

Data service center 20 of system 16 also is designed to provide vehicles with a number of different system back-end functions and generally includes one or more switches, servers, databases, live advisors, as well as an automated voice response system (VRS), all of which are known in the art. These various data service center components are preferably coupled to one another via a wired or wireless local area network. Switch, which can be a private branch exchange (PBX) switch, routes incoming signals so that voice transmissions are usually sent to either the live adviser by regular phone or to the automated voice response system using VoIP. The live advisor phone can also use VoIP; VoIP and other data communication through the switch may be implemented via a modem connected between the switch and network. Data transmissions are passed via the modem to server and/or database. Database can store account information such as subscriber authentication information, vehicle identifiers, profile records, behavioral patterns, and other pertinent subscriber information. Data transmissions may also be conducted by wireless systems, such as 802.11x, GPRS, and the like. Although one embodiment has been described as it would be used in conjunction with a manned data service center 20 using a live advisor, it will be appreciated that the data service center can instead utilize VRS as an automated advisor or, a combination of VRS and a live advisor can be used.

And as will be described more below, in at least one embodiment, the server 18, the data service center 20, or both may be adapted to facilitate taxi services using a number of vehicles (e.g. such as vehicle 24)—e.g., when such taxi services are requested by a user of mobile device 22. In addition, the server 18, center 20, or both may be configured to provide security data (e.g., one or more cryptographic keys) to the mobile device 22, a target taxi vehicle 24, or both. As used herein, a target vehicle is a vehicle that emits a wireless beacon signal, wherein the beacon signal carries information that may be used to identify the vehicle to a mobile device. With respect to the security data, it may be used validate to the vehicle user that the user of the mobile device 22 is the target or intended passenger (e.g., to be picked up). In addition, the security data may be used by the mobile device 22 to further validate the identity of the target vehicle 24. These identifications and validations will be explained more below.

Turning now to the mobile device 22 (FIG. 1), as will be described in greater detail below, mobile device 22 may be used to identify the target vehicle 24—e.g., when a user of the mobile device has requested a taxi or the like. Mobile device 22 includes any suitable portable electronic device. The device 22 may be capable of cellular voice and/or data calls across a wide geographic area where transmissions are facilitated by the wireless carrier system 12. For example, mobile device 22 may be configured to provide cellular services according to a subscription agreement with a third-party facility such as a wireless service provider (WSP). In some embodiments, mobile device 22 may be wirelessly couplable to vehicle 24 via a short-range wireless communication (SRWC) protocol (e.g., such as Wi-Fi Direct, Bluetooth, Bluetooth Low Energy (BLE), Near-Field Communication (NFC), or the like), via a cellular link, or both.

Figure 2:
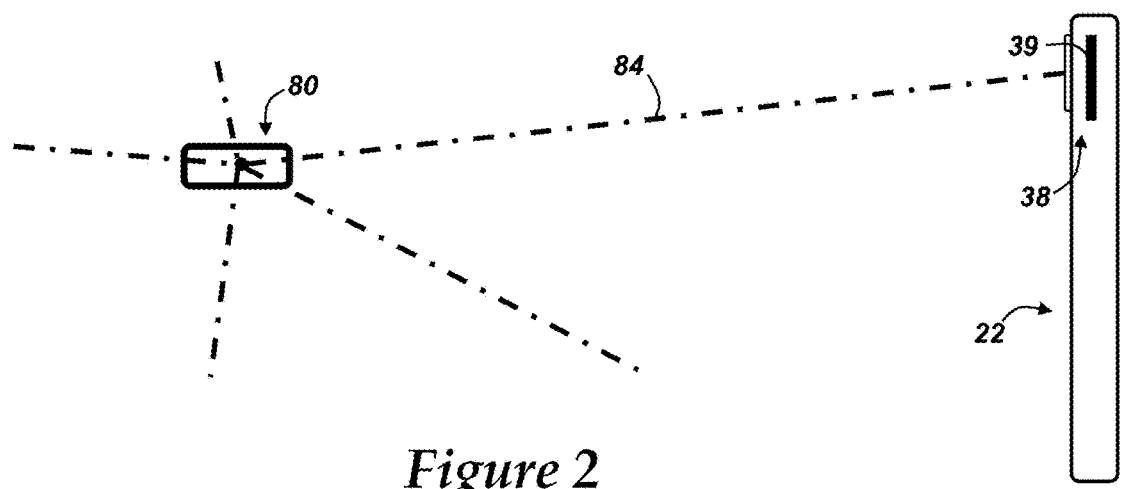
FIG. 2 is a schematic diagram illustrating a mobile device receiving a wireless signal from a vehicle transmitter.

Mobile device 22 may include a user interface 36 (e.g., for input/output (I/O); e.g., a monitor or screen, pushbuttons, a touch screen, or the like), and the user interface 36 may be coupled to a processor 30 which is configured to execute an operating system (OS) stored on device memory 32 (e.g., on a non-transitory computer readable medium of the device). The processor 30 further may execute one or more computer program products stored in device memory 32 as well—e.g., the computer program product(s) may be any suitable program code, collection of instructions, etc., and may be embodied as executable application software 34 that may or may not require user interaction. The device 22 may include a number of other suitable hardware modules, electrical circuits, etc., including a camera or imaging device 38. For example, camera 38 may include an imaging detector 39 (shown only in FIG. 2) that is capable of capturing still images (or single image data) and video images (or video image data) whether or not the camera 38 is recording or storing the image(s) in memory 32. Detector 39 may be adapted to image the visible spectrum, the non-visible spectrum, or a combination thereof. For example, in one embodiment, detector 39 may be configured to sense light wavelengths between about 10 nanometers (nm) and 1 millimeter (mm)—i.e., the visible and infrared (IR) bands. And according to another embodiment, the detector 39 may be configured to sense light wavelengths between about 400 nm and 15 μm (micrometers)—i.e., the visible, near IR, SWIR, MWIR, and LWIR bands. And according to yet another embodiment, the detector 39 may be configured to sense light wavelengths between about 400 nm and 1.4 μm (micrometers)—i.e., the visible and near IR bands. Thus, it should be appreciated that the camera 38 may be suited for well-illuminated and low-light environments. Cameras 38 and imaging detectors 39 are generally known; thus, their additional components and operation will not be described in greater detail here.

As will be described in greater detail below, using processor 30 and one or more applications 34, a mobile device user may transmit a request for transportation services to the backend system 16, receive a cryptographic key from the backend system 16, store the key in memory 32, operate the camera 38, display video image data that includes local scenery and various local objects imaged by the camera 38 wherein the video image data may be relative to a position and orientation of the mobile device 22 (e.g., as held or carried by its user), identify a wireless beacon signal transmitted from a target taxi vehicle (e.g., vehicle 24), positively identify the target vehicle 24 based on a message or identifying information carried by the beacon signal, and, when the vehicle 24 is positively identified, display both a computer-generated graphical element (or graphic image data) and video image data of the target vehicle using augmented reality techniques. For example, video image data may be part of a live, unrecorded video feed from the imaging detector 39 while the graphical element overlays the video feed. (These graphical element(s) may be generated by the processor 30, stored in memory 32, or be a combination thereof.) Thus, according to one embodiment, application 34 may perform at least some of the method steps described herein. Further, application 34 may perform some or all steps automatically or automatically following a user-actuation of the application software 34 (following the user submitting the request).

Some non-limiting examples of the mobile device 22 include a Smart phone, a cellular telephone, a personal digital assistant (PDA), a personal laptop computer or tablet computer having two-way communication capabilities, a netbook computer, a notebook computer, or any suitable combinations thereof. In some instances, the user of the mobile device 22 and the user of the vehicle 24 may be the same person. However, in at least one embodiment, the user of the mobile device is not the same person as the driver of the vehicle 24, as described above in the taxi services implementation. Thus, a mobile device user may be an owner or licensee of the mobile device 22; similarly, a vehicle user may be an owner or licensee of the vehicle 24.

Turning to vehicle 24 (FIG. 1), the vehicle is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 24 may include a number of electrical components, including but not limited to one or more vehicle system or hardware modules (VSMs) 40. One of the VSMs 40 may be a gateway module or gateway communication module 42, and in at least one embodiment, the VSMs 40 and gateway module 42 may be coupled to one or more network connections 44 (e.g., a bus, as will be described below).

The vehicle system modules (VSMs) 40 can be any modular hardware device designed to execute or perform categorical vehicle functions or tasks, or functions or tasks in a particular zone or area of the vehicle 12 (e.g., a front region, a rear region, a side region, etc.). Each VSM 40 may be coupled to various local hardware components, may have suitable control electronics (e.g., including a local processor, local memory, instructions or code stored on the local memory that is executable by the local processor, etc.). Further, VSMs 40 may have any suitable electrical interface for communicating over network connection(s) 44.

Non-limiting examples of other VSMs 40 include a GPS module, an engine control module (ECM), a body control module (BCM), a powertrain control module (PCM), and the like, all of which are known in the art. In some implementations, a GPS module may determine a vehicle position that is used for providing navigation and other position-related services; further, such information may be provided to users of vehicle 24. The ECM automatically may control various aspects of engine operation such as fuel ignition and ignition timing. In addition, the ECM could be equipped with on-board diagnostic features that provide myriad real-time data, such as that received from various sensors including vehicle emissions sensors, and may provide a standardized series of diagnostic trouble codes (DTCs) that allow a technician to rapidly identify and remedy malfunctions within the vehicle 24. In some implementations, the BCM may govern various electrical components located throughout the vehicle 24, like the vehicle's power door locks and headlights, which may be automated, user-actuated, or a combination thereof. And the PCM could be configured to regulate operation of one or more components of the vehicle powertrain. These of course are merely examples of vehicle system modules 40; other embodiments exist.

One or more of the VSMs 40 may be coupled to extra-VSM electronics, sensors, circuits, etc. For example, one VSM 40 is shown coupled to a wireless transmitter or emitter 80; however, it should be appreciated that transmitter 80 could be directly connected to bus 44 as well (e.g., via connection 82). The transmitter 80 may be mounted in any suitable location on vehicle 24; however, in at least implementation, the device is mounted atop vehicle 24 for improved line-of-sight (or LOS) with the intended target or recipient (e.g., mobile device 22), as explained below. In addition, the transmitter 80 may be omni-directional; e.g., transmissions may be sent generally radially outwardly therefrom. Omni-directional transmission may occur sequentially (radially outwardly in different directions at different times) or concurrently in many or all directions, depending on the configuration of the transmitter 80.

Transmitter 80 may be configured to transceive (e.g., send and receive wireless information); however, in at least one embodiment, transmitter 80 operates only in a transmit mode. Further, while all forms of wireless communication are contemplated (e.g., SRWC, acoustic, and various electro-magnetic waves), in at least one embodiment, the transmitter 80 emits light. Non-limiting implementations include visible light and infrared (IR) light; however, these are merely examples. For example, the transmitter may transmit a wireless beacon signal in the form of one or more diverging light beams, one or more diverging laser beams, radially outwardly radiating plane wave(s), etc. in one or more of the visible, near IR, SWIR, MWIR, or LWIR bands. As will be explained more below, the light may be modulated to carry information that indicates an identity of the transmitting vehicle (i.e., that it is the vehicle being sought by the mobile device 22 or mobile device user). In some implementations, the identifying information may be in the form of a predetermined sequence of light pulses or patterns. And in some embodiments, the light pulses may be encoded or encrypted to discourage eavesdropping. Furthermore, light pulse transmissions may have certain benefits over other wireless forms of communication—e.g., light pulse communication may be more resistant to (or less affected by) environmental noise, cross-talk, etc. (e.g., which may make wireless transmission difficult when a number of SRWC signals or other wireless signals are communicating in a local region—e.g., such as some urban areas). Further, while light pulse communication often requires line-of-sight, light transmissions can potentially have a greater range than many forms of short-range wireless communication (e.g., greater than Bluetooth, BLE, Wi-Fi, etc.).

Another one of the VSMs 40, the gateway module 42, may be an electronic module adapted to be an intermediary or portal-type device between the VSMs 40 and extra- or non-vehicular devices, such as the backend system 16 and mobile device 22. According to at least one embodiment, the gateway module 42 may be configured to communicate with the backend system 16 and other devices via cellular communication and to communicate with the mobile device 22 and other devices via short range wireless communication (SRWC). As described in more detail below, the gateway module 42 includes a processor 60, memory 62, and a communication circuit 64 to carry out such communications.

Processor 60 can be any type of device capable of processing electronic instructions, non-limiting examples including a microprocessor, microcontroller, host processor, controller, vehicle communication processor, and an application specific integrated circuit (ASIC). It may be a dedicated processor used only for gateway module 42, or it may be shared with other vehicle systems. Processor 60 executes digitally-stored instructions 68, which may be stored in memory 62, which enable the gateway module 42 to perform one or more vehicle communication functions—e.g., including communicating concurrently at times with mobile device 22, one or more VSMs 40, and in some implementations, backend system 16.

Memory 62 may include any non-transitory computer usable or readable medium, which include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes. As discussed above, memory 62 may store one or more computer program products which may be embodied as software and/or firmware. For example, memory 62 may store instructions 68 which enable the gateway module 42 to facilitate at least a portion of the method described herein.

In some implementations, the gateway module 42 may be part of a vehicle head unit (e.g., infotainment unit) and may have a user interface (e.g., having control knobs, buttons, display, etc.)—e.g., being part of the center stack module; however, this is not required. Further, in at least one embodiment, the gateway module 40 is configured to perform telematics functions—e.g., including but not limited to communicating with cellular and other portable wireless devices. Thus, in at least one embodiment, the communication circuit 64 described above includes one or more SRWC chipsets 66 and one or more cellular chipsets 70. Thus, gateway module 42 can support SRWC connectivity (e.g., via Wi-Fi, Bluetooth, BLE, Wi-Fi Direct, Near Field Communication, etc.) and cellular connectivity (e.g., according to one or more cellular protocols, including but not limited to GSM/GPRS, CDMA (e.g., CDMA2000), and LTE).

According to one embodiment, as will be described in the method below, gateway module 42 establishes communication with backend system 16, receives a cryptographic key from the backend system 16, triggers a transmission of a wireless beacon signal (e.g., when vehicle 24 is within a predetermined geographic region) wherein the beacon signal carries information that can be used to positively identify the vehicle 24 from which the beacon signal was transmitted, and uses the received key to validate an identity of a mobile device (e.g., the intended recipient of the beacon signal). This will be described in greater detail in the method discussed below.

Network connections 44 include any wired intra-vehicle communications system for connecting or coupling the VSMs 40 to one another, as well as coupling the VSMs 40 to other electronic devices. According to one embodiment, the network connection 44 comprises a data bus (e.g., a communication bus, entertainment bus, etc.). Non-limiting examples of suitable network connections include a controller area network (CAN), a media oriented system transfer (MOST), a local interconnection network (LIN), a local area network (LAN), and other appropriate connections such as Ethernet, Audio-Visual Bridging (AVB), or others that conform with known ISO, SAE and IEEE standards and specifications, to name but a few.

The method described below promotes the safety of both a user of the mobile device 22, as well as a driver or other user of vehicle 24. For example, the described method enables a mobile device user to request taxi services so that the target vehicle 24 arrives to pick up the mobile device user, and once vehicle 24 has arrived, the mobile device may identify taxi vehicle 24 according to the beacon signal transmitted therefrom. And as described below, once identified, the mobile device may use AR techniques to assist the user of the mobile device in identifying and/or locating the target vehicle 24.

Figure 3:
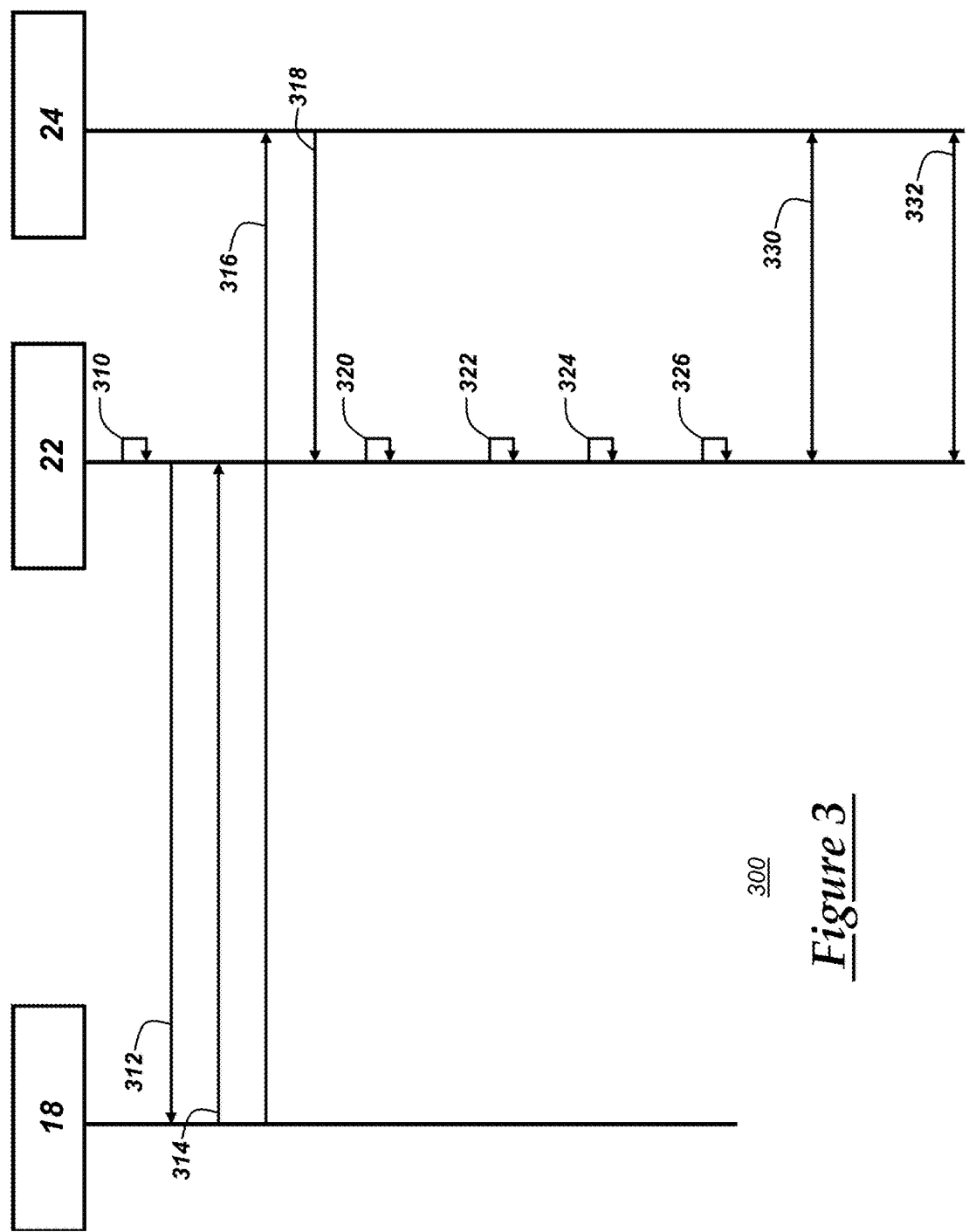
FIG. 3 is a flow diagram depicting a method of identifying a target vehicle using application software on the mobile device.

FIG. 3 is a flow or sequence diagram that illustrates a method 300 of identifying a target vehicle using application software stored in mobile device 22. The method may begin when a mobile device user installs the application software 34 on device 22 (step 310). For example, the application software 34 may be downloaded from an application store, from remote server 18 (or other remote computer), and installed by the user, as will be appreciated by skilled artisans. Of course, the application 34 may be installed in other ways as well.

In step 312 which follows, the mobile device 22 may transmit a request for a vehicle transportation service to the backend system 16. In FIG. 3, this is embodied as a transmission between the mobile device 22 and the remote server 18 (however, as discussed above, this could occur between the mobile device 22 and the data service center 20 instead). According to the embodiment illustrated in FIG. 3, the request pertains to a user of the mobile device 22 requesting that target vehicle 24 (e.g., an unknown or unfamiliar vehicle) drive to a predetermined proximity or location and pick-up the mobile device user. Thus, the request may comprise a mobile device identifier (e.g., MIN, IMSI, an email address, etc.), as well as information pertaining to a geographic pick-up or gathering location (e.g., which can include an address, landmark, or more general area or region), a drop-off or destination location, time data associated with a time when the mobile device user desires to be picked-up (e.g., a timestamp or time range), an electronic payment for fare or cost for the transportation service, etc. Thus, the application software 34 may include any suitable data entry fields and/or requests (e.g., first displayed to the user via interface 36), as well as a user-actuated trigger (e.g., when the mobile device user selects 'send,' the request is sent to the remote server 18).

In steps 314-316, the server 18 may transmit any suitable security data to the vehicle 24 and mobile device 22. For example, the server could transmit via a secure connection two cryptographic or virtual keys—one to the mobile device 22 and the other to the target vehicle 24. It should be appreciated that the server 18, another computing device, or a live operator could determine which vehicle will be designated as the target vehicle 24. For example, the server 18 may be associated with a fleet of vehicles—e.g., each equipped with a transmitter 80; and the target vehicle 24 may be selected from among the fleet of vehicles based on a number of factors. Non-limiting examples of these factors include: proximity to the pick-up location, the time data, current demand (e.g., how many other target recipients also wish to be picked-up), current demand relative to the pick-up location, etc.

Regardless, in step 314, the mobile device 22 may receive one key from the server 18, and in step 316, the selected target vehicle 24 may receive the other key. The use of cryptographic keys is known and will not be described fully herein. However, in at least one embodiment, the keys are according a shared (or private) virtual key system—e.g., the keys may be identical and may be time-sensitive, as described in U.S. Patent Application Publication No. 2016-0203661A1, the entirety of which is hereby incorporated by reference.

Step 316 also may include transmitting other mobile device user information to the target vehicle 24 as well. For example, step 316 may include, among other things, sending information pertaining to the mobile device identifier, the pick-up location, the time data, etc. to vehicle 24.

In step 318, the target vehicle 24 may configure a wireless beacon signal 84 (see also FIG. 2) and may transmit the signal 84 once the vehicle 24 is proximate to the pick-up location (and in accordance with the time data received in step 316). For example, the transmitter 80 or one of the VSMs 40 may configure the beacon signal by encoding and/or encrypting the mobile device identifier received in step 316 so that characteristics of the signal 84 include a predetermined sequence of light pulses associated with the identifier. In this manner, upon receipt at the mobile device 22, the device 22 may be decode and/or decrypt the light pulses to identify and locate the target vehicle 24 as the source the transmission 84, as explained below.

The beacon signal 84 may be emitted in one or more directions—and in at least one embodiment, the beacon signal is emitted in 360°, or nearly so (e.g., in 0°, 90°, 180°, and 270° directions, or in 0°, 45°, 90°, 135°, 180°, 225°, 270°, and 315° directions—just to cite a couple of examples). As described above, the nature of the beacon signal 84 may vary; however, in at least one exemplary embodiment, the beacon signal includes one or more diverging light beams, one or more diverging laser beams, radially outwardly radiating plane wave(s), etc. in one or more of the visible, near IR, SWIR, MWIR, or LWIR bands.

In step 320, the mobile device user—using the camera 38 of the mobile device 22 and the application software 34 executed thereon—may scan the pick-up region for the target vehicle 24 according to the time data sent by the mobile device 22 to the server 18. For example, the mobile device user may position, orient, and move the mobile device 22 so that the camera 38 captures image data of the user's surroundings. This image data may or may not be displayed on the user interface 36 (e.g., in real-time or nearly in real-time). While executing the scan, the mobile device need not store data in memory 32; however, in at least some implementations, image data is at least temporarily stored therein. During this step, the camera 38 may receive light that includes the transmitted beacon signal 84.

Steps 322-324 occur at mobile device 22 in response to receiving the beacon signal 84. For example, in step 322, the camera 38—or more particularly, the image detector 39—receives or captures the beacon signal when the user correspondingly positions and orients the mobile device 22, and, according to the instructions of software 34, the processor 30 may recognize or identify the beacon signal 84 as a signal of interest. In addition, processor 30 may store the received beacon signal (or at least data associated with it) in memory 32. Thereafter, the processor 30 may execute one or more signal processing instructions that include decoding (and/or decrypting) the signal 84. When the signal 84 is decoded and/or decrypted, the processor 30 of the mobile device 22 may identify or otherwise determine that the signal includes the desired mobile device identifier—and consequently was sent from a desired source (the target vehicle 24).

Figure 4:
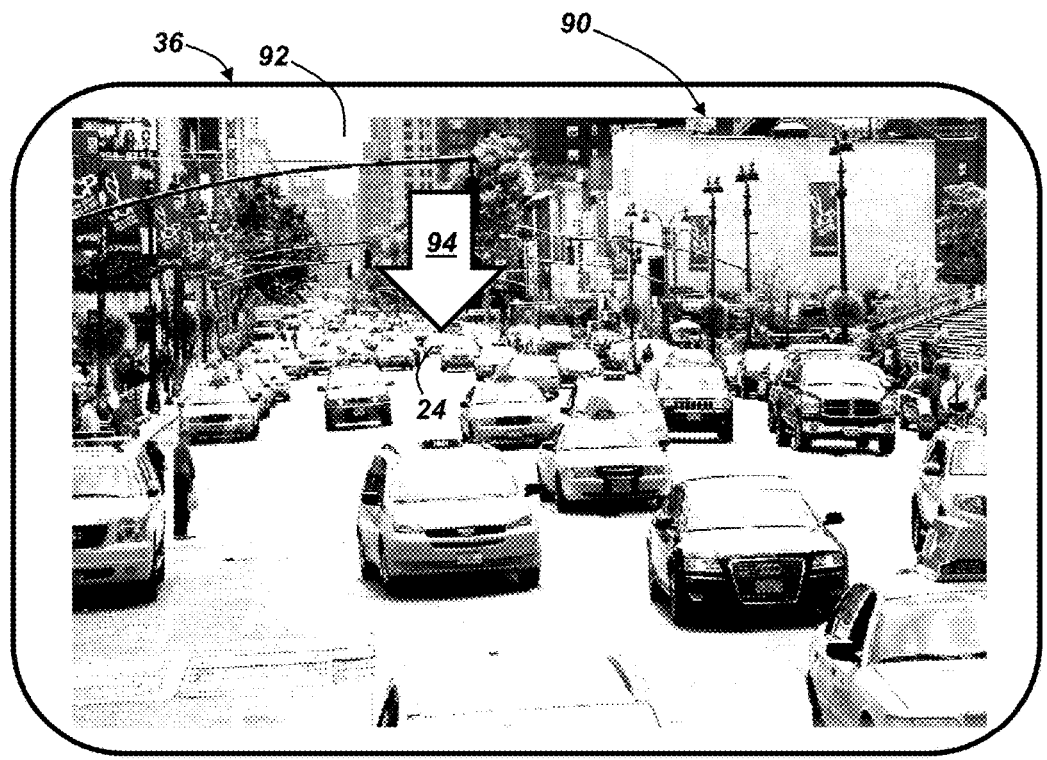
FIG. 4 illustrates a display of the mobile device providing augmented reality video image data.

In step 324, having identified the target vehicle 24, the processor 30 may display augmented video image data 90 (or continue to display augmented video image data) on the user interface 36, as illustrated in FIG. 4. As used herein, augmented reality (AR) image data 90 includes image data 92 associated with image(s) captured by the detector 39 but which also has one or more graphical elements 94 that overlay (or are merged with) the image data captured by the detector 39. The illustrated graphical element 94 is an arrow (which could move with the vehicle 24 as the vehicle moves within the displayed video image data); however, the arrow is merely an example. The element 94 could be a box or shape surrounding the image of the vehicle 24, a textual description (e.g., of the make, model, and/or license plate of vehicle 24), or any other suitable identifier or identifying information. Non-limiting examples of graphical elements include any text, shape, image enhanced coloring and/or shading, and the like that visually illustrates to a user of the mobile device the identity and location of the target vehicle 24 (on display 36). Regardless the nature of the graphical element, the element provides some indication within the image data that the target vehicle 24 is the vehicle requested by the mobile device user.

It should be appreciated that in order to locate the target vehicle 24, the mobile device user may use a combination of his or her own direct line-of-sight (LOS) with the target vehicle 24 as well as the displayed video image data on interface 36 (e.g., based on the LOS between vehicle transmitter 80 and image detector 39). Of course, instructions 34 could include displaying other AR features to orient the mobile device user as well (e.g., if the vehicle is North of the mobile device user and mobile device 22 is moving South (with camera 38 is pointing South), directional arrows pointing to the right may lead or guide the user to turn toward the intended target 24). These are merely examples; other implementations are possible (e.g., including audible or other visual instructions).

In step 326 which follows, the mobile device user may approach the vehicle 24—e.g., to enter the vehicle and be picked-up. As the mobile device user and/or vehicle 24 move closer to one another, they may enter a short range wireless communication (SRWC) proximity.

And in steps 330-332, the vehicle 24 and mobile device 22 may carry out further validation steps using a SRWC link. Of course, this may occur anytime when the vehicle 24 and mobile device 22 are within proximity of each other. Thus, in step 330, the vehicle 24 and device 22 may establish the SRWC link therebetween. Establishing SRWC communication may be carried out according to any known techniques.

In step 332, the vehicle 24 and mobile device 22 may perform cross-validation using the keys received in steps 314-316. These steps are generally known in the art and may include the validation of virtual keys which expire after a predetermined period of time—the entirety of which is disclosed in U.S. Patent Application Publication No. 2016-0203661A1 (previously incorporated by reference above). It should be appreciated that steps 330-332 may be carried out for the protection of the driver of the vehicle 24, as well as the user of the mobile device 22. For example, these steps may ensure that the driver of vehicle 24 has some validation that the mobile device user is the appropriate person to pick up at that location—thereby promoting his or her safety. In addition, the safety of the mobile device user is promoted further (e.g., in the event the beacon signal was somehow spoofed or hacked).

In at least one embodiment, step 332 may be carried out (or repeated) when the mobile device 22 user (and presumably the mobile device user) are within a predetermined threshold proximity (e.g., within 20 feet, within 30 feet, or the like). In this manner, the gateway module 42 may use various techniques known in the art such as proximity detection (e.g., using signal strength (RSSI) or the like) to determine when the mobile device 22 (and presumably the mobile device user) are relatively close to the vehicle 24. In this manner, validation may occur while the vehicle user has a direct line-of-sight (LOS) with the approaching mobile device user—e.g., to further be sure that the proper person is entering the vehicle.

When the respective keys are validated, in some embodiments, the vehicle driver may receive an affirmative visual, audible, and/or tactile message via the gateway module 42 and the mobile device user may receive an affirmative visual, audible, and/or tactile message via device 22 indicating validation. Of course, this is not required. And if the keys are not validated, the gateway module 42 and mobile device 22 may indicate via similar means a warning to their respective users. Following step 332, the method may end.

Other implementations also exist. For example, at least some portions of steps 312-314 and 330-332 may be omitted. For example, no keys may be used or be required. However in step 316, the vehicle 24 may still receive mobile device user information pertaining to the mobile device identifier, the pick-up location, time, etc.

Or for example, with respect to the request sent in step 312, it may be sent to a remote server 18 that is connected to the backend system, but not owned by the same entity that owns the backend system. For example, this server may be a third-party taxi service provider or the like.

According to another embodiment, the mobile device may not send the mobile device identifier to the backend system 16, but instead, the backend system 16 may determine a suitable identifier and provide that identifier to both the target vehicle 24 and mobile device 22.

According to another embodiment, the target vehicle 24 is not a taxi vehicle, but instead is associated with a car swap, a ride share (or car pool), or any other instance when the user of the mobile device is unfamiliar with the target vehicle 24 and would like assurance that a particular vehicle is in fact the target vehicle. For example, car swaps pertain to a scenario when an authorized user temporarily authorizes another user to enter and operate his or her vehicle. Ride shares (or literally sharing a 'ride') involve traveling to the same destination and using a single, shared vehicle—e.g., where an authorized vehicle user permits another person to ride therewith to a common destination.

In still other implementations, the security data used in steps 312-314 and 330-332 may differ. For example, the security data could include the use of public key infrastructure (PKI) instead. Other forms of security data could also be used with the shared key embodiment, with the PKI embodiment, or with other suitable implementations—e.g., incorporating the use of nonce challenges and the like.

Thus, there has been described a communication system adapted to assist a user in identifying a target vehicle. The user may utilize a mobile device to identify the target vehicle when the target vehicle emits a wireless beacon signal. In at least some instances, the mobile device may use a camera to identify the beacon signal. Upon identification, the mobile device may use augmented reality techniques to assist the user in identifying and locating the targeted vehicle.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of identifying a target vehicle using application software on a mobile device, the method comprising the steps of:

transmitting a request for a vehicle transportation service to a remote server, wherein the remote server is configured to send security data to the target vehicle and the mobile device after receiving the request for the vehicle transportation service;

receiving at the mobile device a wireless signal transmitted from a transmitter at the target vehicle, wherein the wireless signal is received using an imaging detector in the mobile device;

identifying that the target vehicle is a source of the wireless signal based on characteristics of the wireless signal, wherein the characteristics of the wireless signal includes information concerning the mobile device and/or the target vehicle that was shared with the mobile device and/or the target vehicle in response to establishing that the target vehicle is to be used for the vehicle transportation service;

capturing video image data using a camera included on the mobile device, wherein the captured video image data includes an image of the target vehicle;

in response to the identification, displaying to a user on a display of the mobile device an indication of an identity of the target vehicle and the captured video image data, wherein the indication of the identity of the target vehicle is represented by a computer-generated graphical element, and wherein the computer-generated graphical element is overlaid on the captured video image data; and establishing a short-range wireless communication (SRWC) link between the mobile device and the target vehicle using the security data that is received from the remote server.

2. The method of claim 1, wherein the wireless signal is comprised of light, wherein the mobile device receives the wireless signal when the mobile device is within a line-of-sight (LOS) of the transmitter.

3. The method of claim 1, wherein the characteristics of the wireless signal include a predetermined sequence of light pulses.

4. The method of claim 3, wherein the predetermined sequence of light pulses are representative of a mobile device identifier provided by the mobile device to the remote server.

5. The method of claim 1, wherein the characteristics of the wireless signal comprise encoded, infrared (IR) light pulses.

6. The method of claim 1, wherein the video image data is part of a live, unrecorded video feed from the imaging detector of the mobile device, and wherein the camera comprises the imaging detector.

7. The method of claim 1, further comprising after the displaying step, validating the target vehicle using the short range wireless communication (SRWC) link between the target vehicle and the mobile device, wherein the validation includes using a first virtual key provided to the mobile device from the remote server and a second virtual key provided to the target vehicle from the remote server.

8. The method of claim 1, wherein the transmitting step is carried out prior to the receiving, identifying, and displaying steps, wherein the vehicle transportation service request includes an identifier, time data, and geographical data, each of the identifier, time data, and geographical data being associated with the target vehicle arriving to meet the user of the mobile device.

9. The method of claim 8, wherein the wireless signal includes data associated with the identifier provided by the mobile device to the remote server.

10. A method of identifying a target vehicle using application software on a mobile device, the method comprising the steps of:

transmitting from the mobile device a vehicle transportation service request for a vehicle transportation service to a remote server, wherein the remote server is configured to send security data to the mobile device and the target vehicle;

in response to the transmitted request, receiving at an imaging detector of the mobile device a beacon signal that includes identifying information, wherein the beacon signal is comprised of light;

in response to the receiving the beacon signal, identifying that a source of the beacon signal is the target vehicle based on the identifying information, wherein the identifying information of the beacon signal includes information concerning the mobile device and/or the target vehicle that was shared with the mobile device and/or the target vehicle in response to establishing that the target vehicle is to be used for the vehicle transportation service;

capturing video image data using a camera included on the mobile device, wherein the captured video image data includes an image of the target vehicle;

in response to the identifying step, displaying on a display of the mobile device the captured video image data that includes the image of the target vehicle and a computer-generated graphical element overlaying or merged with the image of the target vehicle, wherein the image of the target vehicle and the computer-generated graphical element are arranged to enable a user of the mobile device to identify the target vehicle; and establishing a short-range wireless communication (SRWC) link between the mobile device and the target vehicle using the security data that is received from the remote server.

11. The method of claim 10, further comprising:

in response to the transmitting step, receiving at the mobile device a cryptographic key from the remote server; and after the identifying step, using the cryptographic key, validating the target vehicle using a short range wireless communication (SRWC) link between the target vehicle and the mobile device.

12. The method of claim 10, wherein the vehicle transportation service request includes a mobile device identifier, a geographic pick-up location, and time data associated with a time when the mobile device user desires to be picked-up.

13. The method of claim 12, wherein the identifying information used in the identifying step is associated with the mobile device identifier transmitted with the vehicle transportation service request.

14. The method of claim 10, wherein the beacon signal is comprised of predetermined sequence of light pulses, wherein the light pulses include light in the infrared band.

15. A computer program product, comprising a non-transitory computer-readable medium for a mobile device, comprising computer program instructions that enable the mobile device to identify a target vehicle based on a wireless beacon signal transmitted from the target vehicle that is comprised of light, said computer program product comprising:

instructions for transmitting from the mobile device a vehicle transportation service request for a vehicle transportation service to a remote server, wherein the remote server is configured to send security data to the mobile device and the target vehicle;

instructions for receiving at an imaging detector of the mobile device a beacon signal that includes identifying information in response to the transmitted request;

instructions for identifying that a source of the beacon signal is the target vehicle based on the identifying information, wherein the identifying information of the beacon signal includes information concerning the mobile device and/or the target vehicle that was shared with the mobile device and/or the target vehicle in response to establishing that the target vehicle is to be used for the vehicle transportation service;

instructions for capturing image data using a camera included on the mobile device, wherein the captured image data includes an image of the target vehicle;

instructions for, in response to executing the identifying instructions, displaying on a display of the mobile device augmented reality (AR) video image data that includes the image of the target vehicle and a computer-generated graphical element overlaying or merged with the image of the target vehicle, wherein the AR video image data is arranged to assist a user of the mobile device to identify and locate the target vehicle; and instructions for establishing a short-range wireless communication (SRWC) link between the mobile device and the target vehicle using the security data that is received from the remote server.

* * * * *